(12) United States Patent
Wu et al.

(10) Patent No.: US 6,816,664 B2
(45) Date of Patent: Nov. 9, 2004

(54) MOTOR DRIVEN VARIABLE OPTICAL ATTENUATOR

(75) Inventors: Kun-Tsan Wu, Tu-Chen (TW); Chien-Cheng Chen, Tu-Chen (TW)

(73) Assignee: Hon Hai Precision Ind. Co., Ltd., Taipei Hsien (JP)

( * ) Notice: Subject to any disclaimer, the term of this patent is extended or adjusted under 35 U.S.C. 154(b) by 133 days.

(21) Appl. No.: 10/115,152

(22) Filed: Apr. 2, 2002

(65) Prior Publication Data

US 2003/0091320 A1 May 15, 2003

(30) Foreign Application Priority Data

Nov. 15, 2001 (TW) ...................................... 90219619 U

(51) Int. Cl.[7] .............................................. G02B 6/00
(52) U.S. Cl. ........................................ 385/140; 385/39
(58) Field of Search ........................... 385/140, 31–32, 385/39, 52

(56) References Cited

U.S. PATENT DOCUMENTS 4,989,938 A * 2/1991 Tamulevich ................. 385/33
6,614,983 B2 * 9/2003 Wu et al. .................... 385/140
6,625,377 B2 * 9/2003 Chang ........................ 385/140

* cited by examiner

*Primary Examiner*—Akm Enayet Ullah
*Assistant Examiner*—Jerry T Rahll
(74) *Attorney, Agent, or Firm*—Wei Te Chung

(57) ABSTRACT

A motor driven variable optical attenuator (10) comprises a base (12), a cover (13), an attenuation device (11), and a motor (19). The attenuation device comprises a fixed collimator (111), a movable collimator (112) retained in a holding device (113), and an adjusting device. The two collimators are aligned end-to-end. The adjusting device comprises a first screw rod (114), and a second screw rod (115). The first screw rod comprises a thread portion (1141) rotatably engaged in the holding device, and a gear (1142). The second screw rod comprises a thread portion (1151), and a head (1152). The thread portion of the second screw rod meshes with the gear of the first screw rod. The motor comprises a cylindrical projection (195) engaged in the head of the second screw rod. The motor rotates the second screw rod, which drives the first screw rod, which laterally moves the holding device.

9 Claims, 7 Drawing Sheets

MOTOR DRIVEN VARIABLE OPTICAL ATTENUATOR

BACKGROUND OF THE INVENTION

1. Field of the Invention

The present invention relates to variable optical attenuators, and particularly to an electrical variable optical attenuator having a motor to control optical attenuation.

2. Description of Prior Art

Attenuators are widely used in optical transmission systems for reducing high power transmission signals to moderate signals for application in a variety of optical apparatuses.

FIG. 1 shows a variable optical attenuator 100 as disclosed in U.S. Pat. No. 4,989,938. The variable optical attenuator 100 comprises a housing 150 containing a first optical fiber connector 140, a first optical lens 160, a first connecting optical fiber 180, a second optical lens 200 separated from the first optical lens 160 by an optical coupling space, a second optical fiber connector 220, a second connecting optical fiber 240, an optical filter 260 and a reciprocating means 280. The filter 260 is a flexible film having an optical density gradient which varies along a length of the filter 260. The filter 260 is preferably mounted substantially orthogonally to an optical axis of the optical coupling space.

When the filter 260 is moved vertically, a part of the filter 260 having a different optical density is put in a path of light passing through the optical coupling space. The filter 260 can thus control transmission and absorption of differing amounts of light. By varying the vertical position of the filter 260, the degree of light attenuation provided by the filter 260 can be varied. Nevertheless, it is difficult and expensive to manufacture the filter 260 to attain the necessary optical density gradient.

Thus, it is desired to provide a variable optical attenuator which is inexpensive to manufacture and which can precisely control the amount of optical attenuation.

SUMMARY OF THE INVENTION

Accordingly, an object of the present invention is to provide an inexpensive variable optical attenuator.

Another object of the present invention is to provide a variable optical attenuator which uses a motor to precisely control an amount of optical attenuation.

To achieve the above objects, a motor driven variable optical attenuator of the present invention comprises a rectangular base, a cover, an attenuation device and a motor. The attenuation device comprises a fixed collimator, a movable collimator, a holding device retaining the movable collimator, and an adjusting device. The two collimators are aligned end-to-end. The holding device defines a passage in which the movable collimator is retained, and a threaded hole. The adjusting device comprises a first screw rod, and a second screw rod. The first screw rod comprises a thread portion, a gear, and a round head. The thread portion of the first screw rod is rotatably engaged in the threaded hole of the holding device. The second screw rod comprises a thread portion, a round head and a keyhole defined in the round head. The thread portion of the second screw rod meshes with the gear of the first screw rod. The motor comprises a quadrant-shaped base, a main body, and a grounding plate. The main body has a rotatable cylinder, and a cylindrical projection engaged in the keyhole of the round head of the second screw rod.

When the second screw rod is rotated by the motor, the thread portion of the second screw rod drives the gear to rotate the first screw rod, and the first screw rod rotatingly drives the holding device to move toward the round head of the first screw rod or away from the round head of the first screw rod. Thus an offset, if any, between the two collimators can be adjusted. Accordingly, an amount of optical attenuation of the attenuator can be precisely controlled via the motor.

Other objects, advantages and novel features of the present invention will be drawn from the following detailed description of a preferred embodiment of the present invention with attached drawings, in which:

DETAILED DESCRIPTION OF PREFERRED EMBODIMENT

Figure 1:
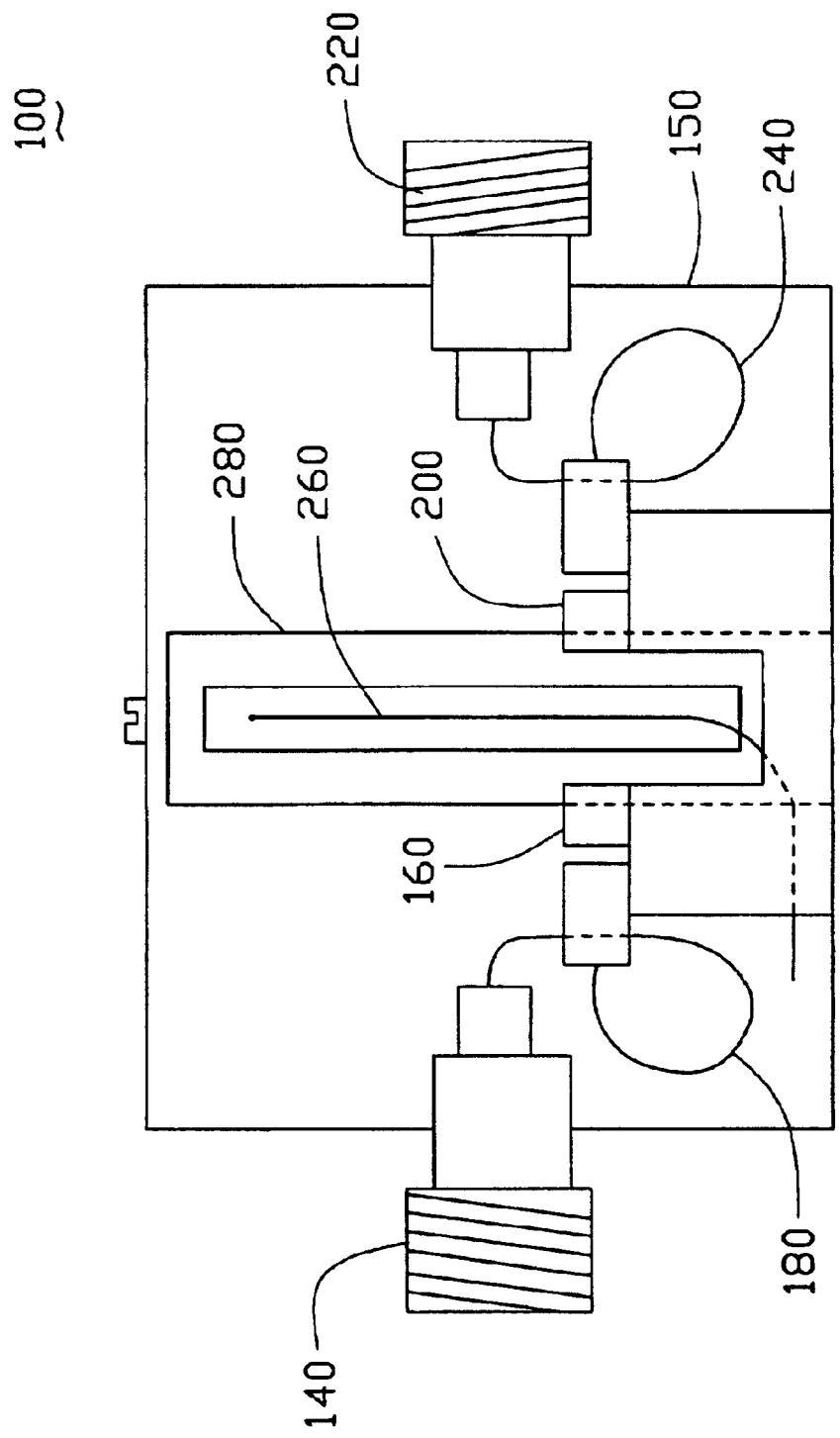
FIG. 1 is a schematic side plan view of a conventional variable optical attenuator.
Figure 2:
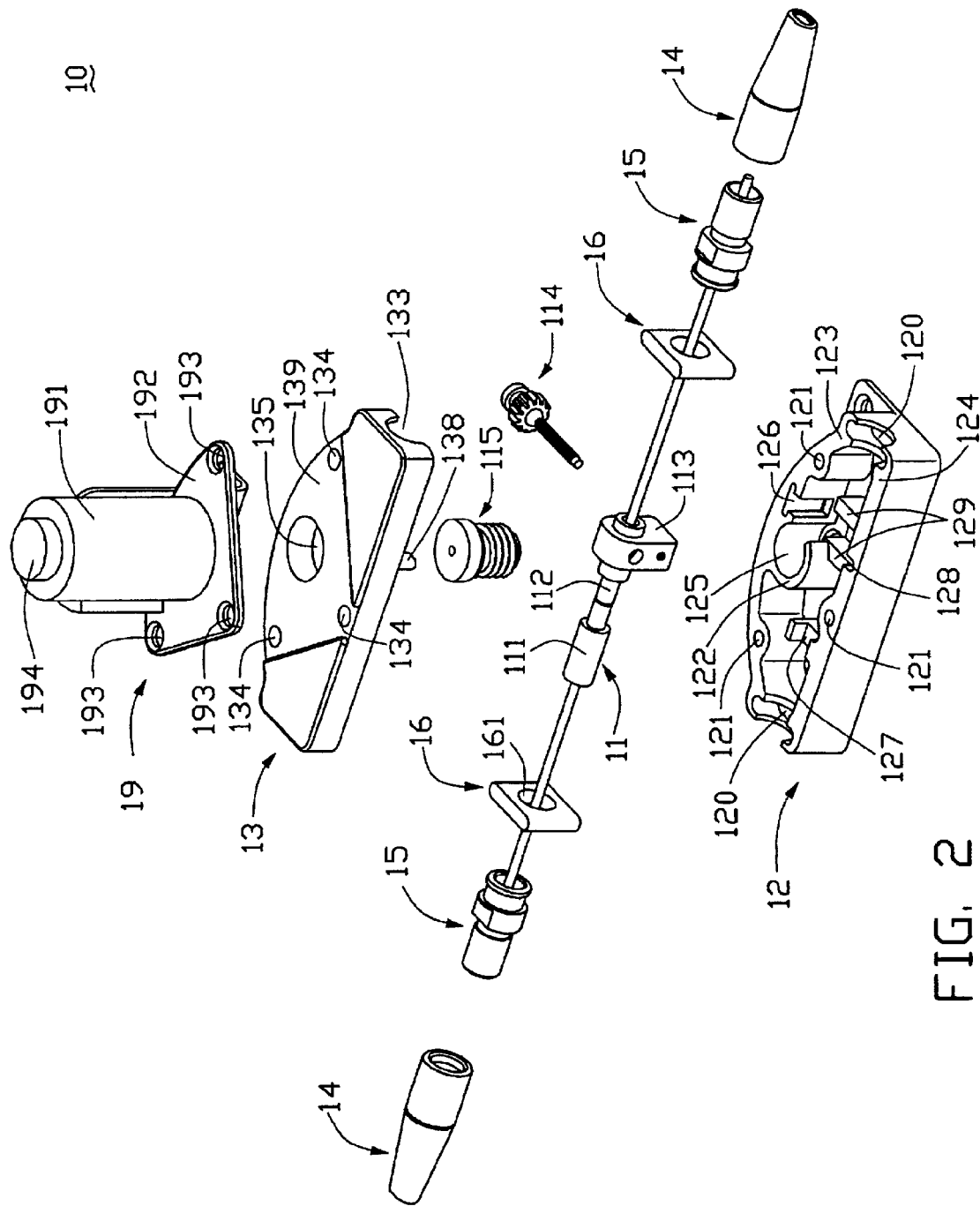
FIG. 2 is an exploded perspective view of a motor driven variable optical attenuator in accordance with the present invention.

Referring to FIG. 2, a motor driven variable optical attenuator 10 in accordance with the present invention comprises an attenuation device 11, a rectangular base 12, a cover 13, a pair of strain relief boots 14, a pair of retaining bodies 15, a pair of interconnection members 16 and a motor 19.

Figure 3:
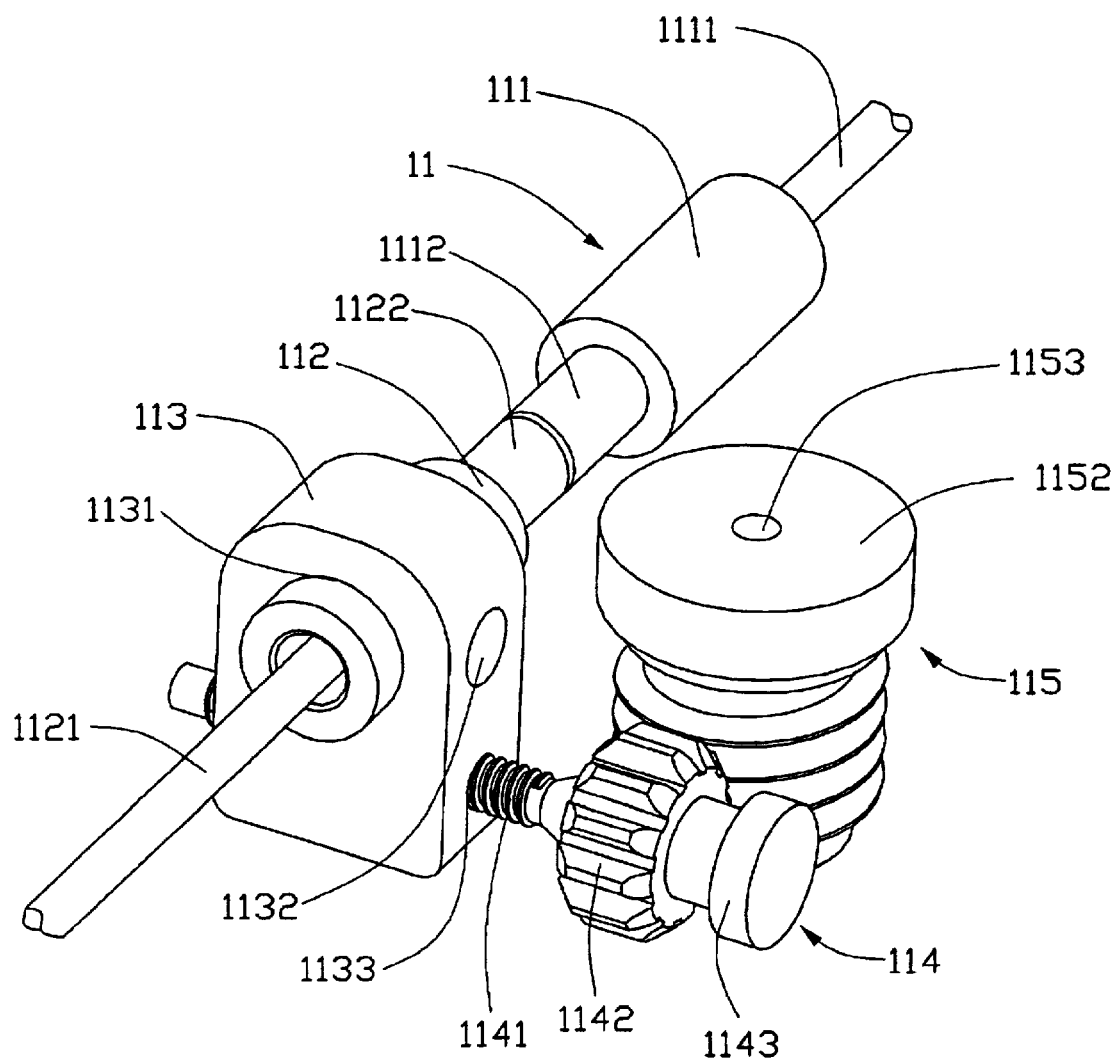
FIG. 3 is a perspective view of an adjusting device of the attenuator of FIG. 2.

Referring also to FIG. 3, the attenuation device 11 comprises a fixed collimator 111, a movable collimator 112, a movable holding device 113, and an adjusting device including a first screw rod 114 and a second screw rod 115. The fixed and movable collimators 111, 112 respectively include optical fibers 1111, 1121, and collimating components 1112, 1122 preferably being Graded Index lenses. The holding device 113 comprises an arch-shaped upper end (not labeled), and a generally rectangular lower end (not labeled). A passage 1131 is longitudinally defined in the upper end of the holding device 113, for retaining the movable collimator 112 therein. A hole 1132 is laterally defined in the upper end of the holding device 113. The hole 1132 is orthogonal to and in communication with the passage 1131, for insertion of a bolt or epoxy thereinto to fasten the movable collimator 112 to the holding device 113. Thus the combined movable collimator 112 and holding device 113 can move together as one piece. A threaded hole 1133 is laterally defined in the lower end of the holding device 113.

The first screw rod 114 comprises a thread portion 1141, a gear 1142, and a round head 1143. The head 1143 is formed at one end of the first screw rod 114. The thread portion 1141 is formed on a middle portion and on an opposite end of the first screw rod 114, for rotatably engaging in the threaded hole 1133 of the holding device 113. The gear 1142 is formed between the head 1143 and the thread portion 1141, for engaging with the second screw rod 115.

The second screw rod 115 comprises a round head 1152 at a top thereof, and a thread portion 1151 below the head 1152. A keyhole 1153 is defined in the head 1152. One or more keys (not shown) is formed on the head 1152 in the keyhole 1153, for engaging with the motor 19. The thread portion 1151 is for engaging with the gear 1142 of the first screw rod 114.

Figure 4:
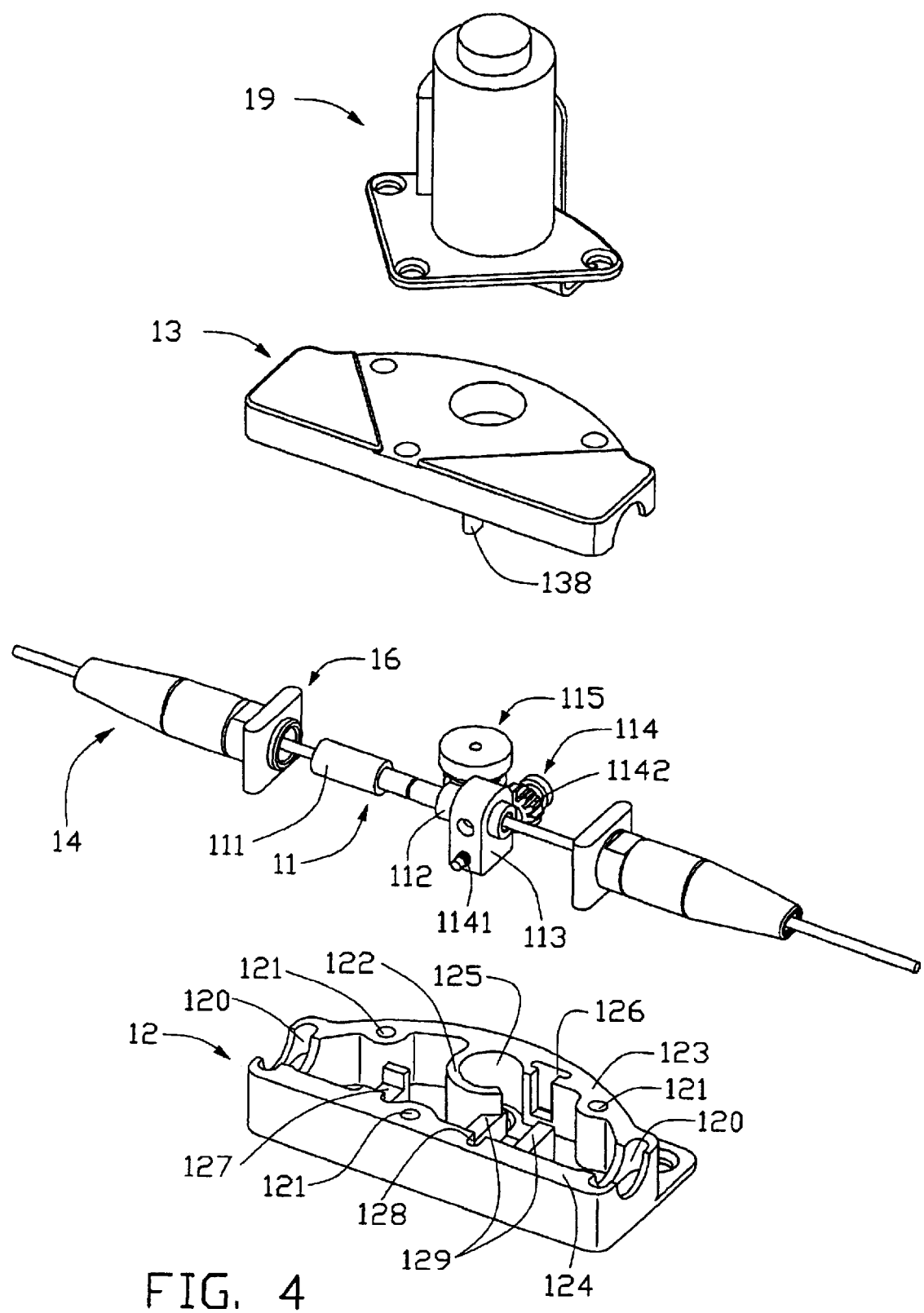
FIG. 4 is a partly assembled view of FIG. 2.
Figure 5:
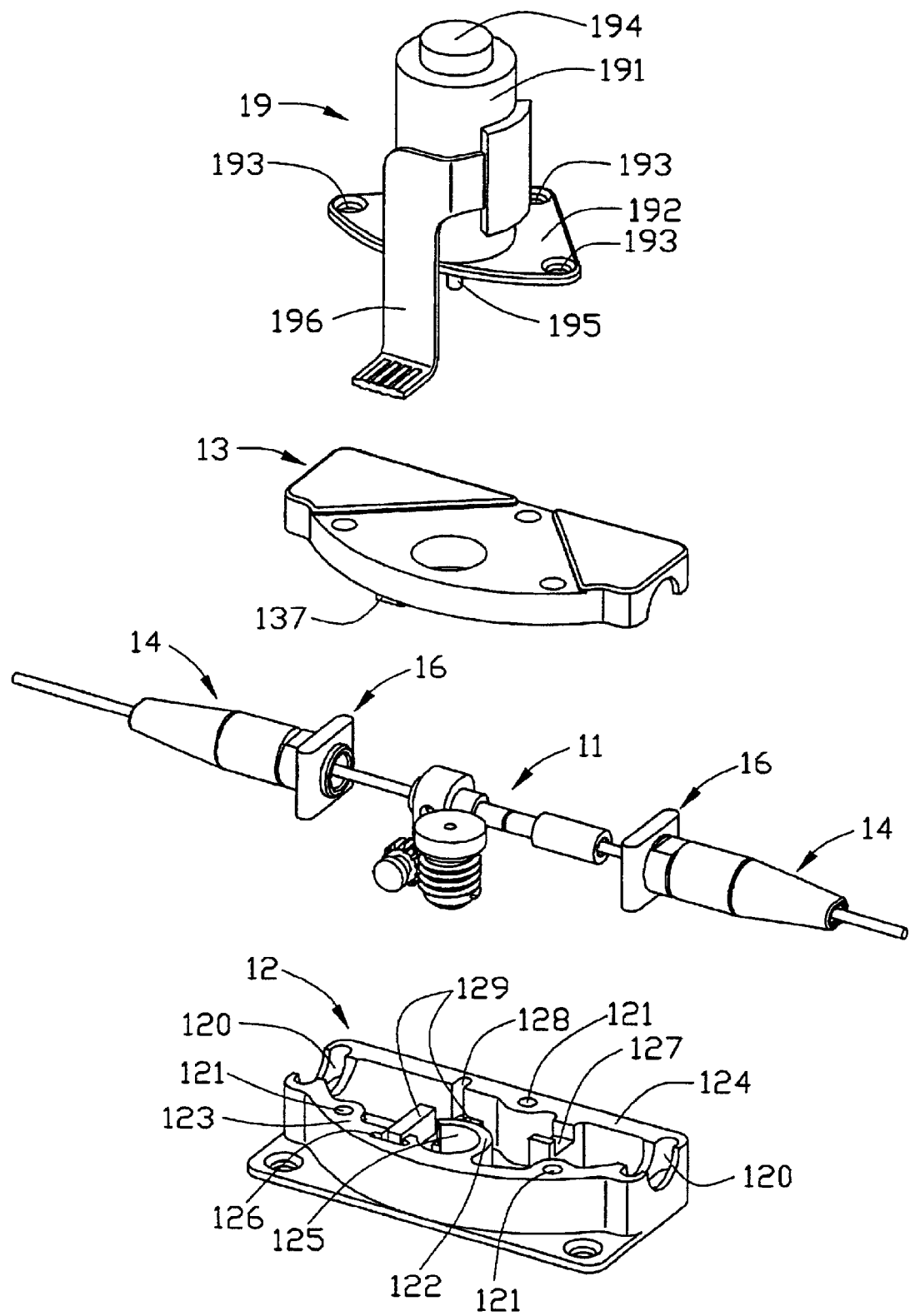
FIG. 5 is similar to FIG. 4, but viewed from another aspect.

Referring to FIGS. 2, 4 and 5, the rectangular base 12 comprises a main wall (not labeled), an arcuate first sidewall 123, a second sidewall 124, and a pair of end walls (not labeled) respectively connecting opposite ends of the first and second sidewalls 123, 124. The first and second sidewalls 123, 124 and end walls extend upwardly from the main wall. Two retaining slots 120 are respectively defined in the end walls. Two spaced screw holes 121 are defined in a top surface of the first sidewall 123. Another screw hole 121 is defined in a top surface of a middle portion of the second sidewall 124. The three screw holes 121 are thus arranged in a generally triangular formation. A round projection 122 extends upwardly from a middle portion of the main wall, and is integrally joined with a middle portion of the first sidewall 123. A round hole 125 is defined in the round projection 122, for receiving and retaining the second screw rod 115 therein. A gap (not labeled) is defined in the round projection 122, in communication with the round hole 125 and with an interior of the rectangular base 12. The gap enables the thread portion 1151 of the second screw rod 115 to engage with the gear 1142 of the first screw rod 114. A T-shaped slot 126 is defined in a top surface of the first sidewall 123 near the gap, for receiving the head 1143 of the first screw rod 114. Two parallel ribs 129 extend upwardly from the main wall opposite to the T-shaped slot 126. The ribs 129 are orthogonal to the second sidewall 124, and define a lateral groove (not labeled) therebetween for receiving and retaining the holding device 113. A receiving groove 128 is defined in the second sidewall 124 generally between the ribs 129, for accommodating a distal end of the thread portion 1141 of the first screw rod 114. A rectangular projection (not labeled) extends upwardly from a middle portion of the main wall. The rectangular projection is integrally joined with the second sidewall 124, and spaced from the round projection 122 and from the ribs 129. A cutout 127 is defined in the rectangular projection, for receiving the fixed collimator 111 therein.

Figure 6:
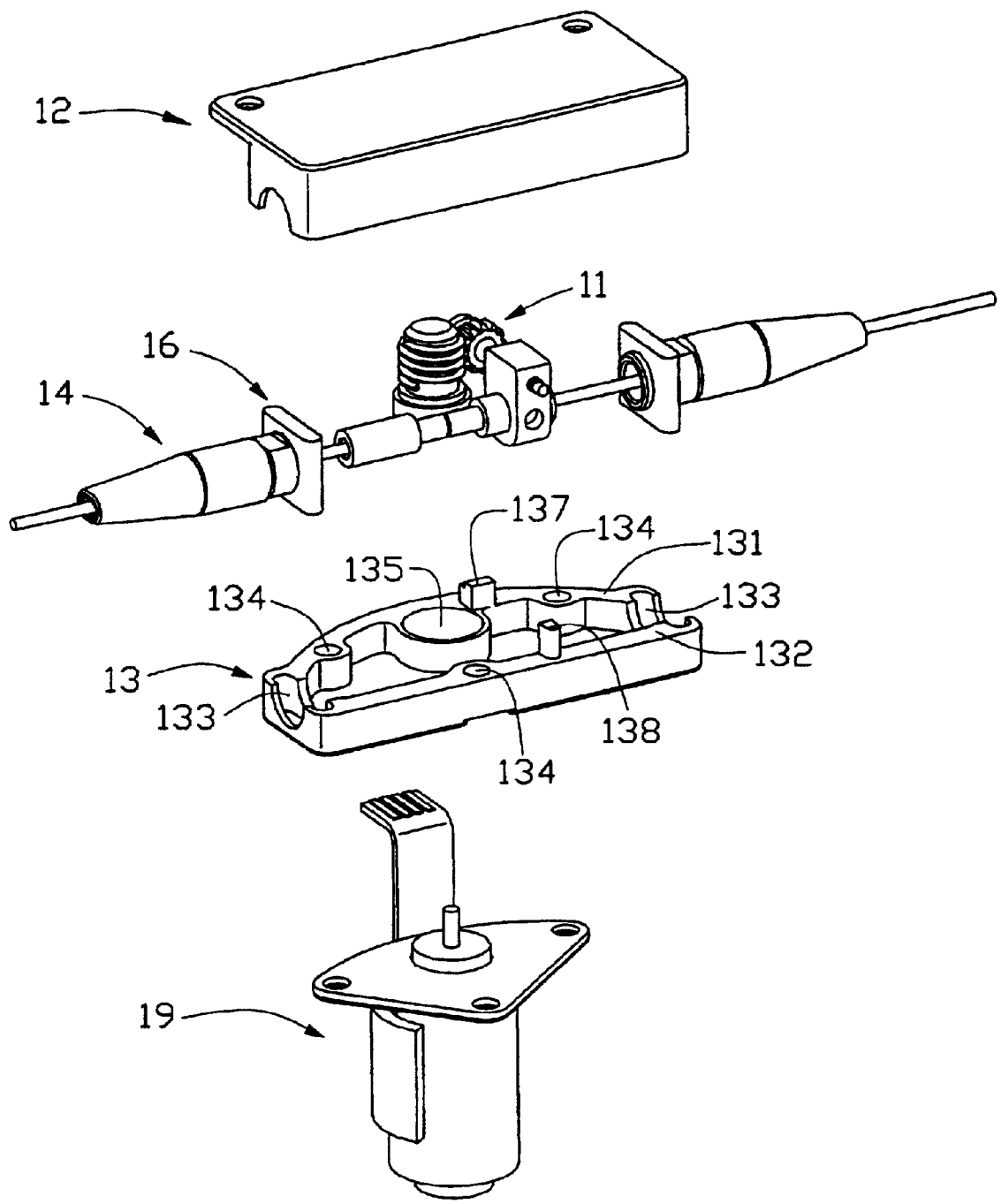
FIG. 6 is similar to FIG. 4, but viewed from a bottom aspect.
Figure 7:
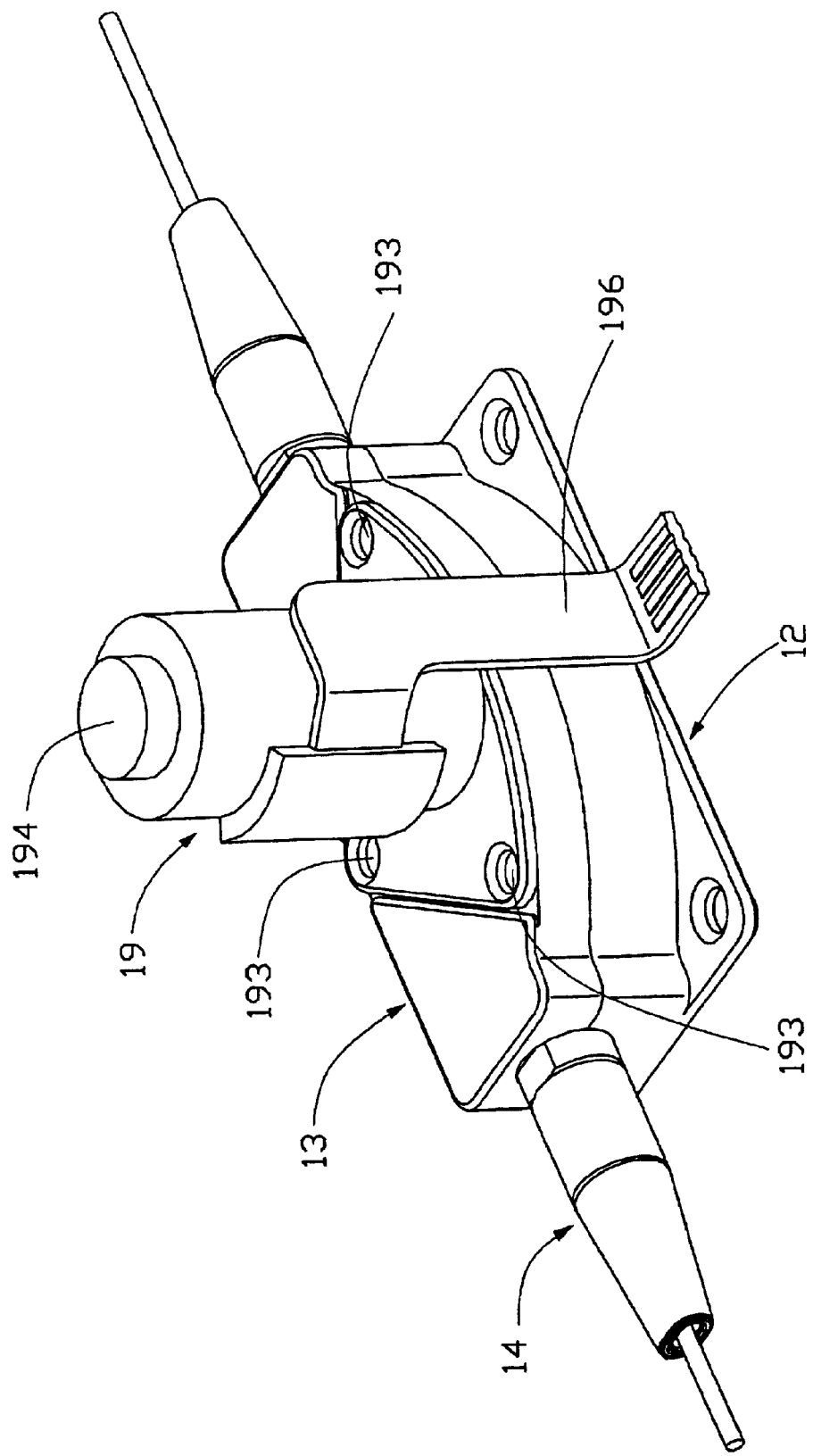
FIG. 7 is a fully assembled view of FIG. 5.

As best shown in FIGS. 2, 5 and 6, the cover 13 comprises a main wall (not labeled) having a central quadrant-shaped recessed portion 139 formed thereon, an arcuate first sidewall 131, a second sidewall 132, and a pair of end walls (not labeled) respectively connecting opposite ends of the first and second sidewalls 131, 132. The first and second sidewalls 131, 132 and end walls depend from the main wall. Two retaining slots 133 are respectively defined in the end walls, corresponding to the retaining slots 120 of the base 12. Two spaced through holes 134 are defined in a bottom surface of the first sidewall 131. Another through hole 134 is defined in a middle portion of a bottom surface of the second sidewall 132. The three through holes 134 correspond to the screw holes 121 of the rectangular base 12. A round projection 136 depends from a middle portion of the main wall, and is integrally joined with a middle portion of the first sidewall 131. A round hole 135 is defined in the round projection 136, for receiving a top portion of the second screw rod 115 therein. A T-shaped projection 137 is formed on the bottom surface of the first sidewall 131 near the round hole 135, corresponding to the T-shaped groove 126 of the rectangular base 12. A protrusion 138 is formed on a middle portion of the bottom surface of the second sidewall 132, corresponding to the receiving groove 128 of the rectangular base 12.

The motor 19 comprises a cylindrical main body 191, a quadrant-shaped base 192, and a grounding plate 196. A rotatable cylinder 194 is retained in a center of the main body 191, and protrudes from opposite ends of the main body 191. A cylindrical projection 195 integrally depends from a bottom of the cylinder 194 below the quadrant-shaped base 192. One or more keyways (not shown) is defined in the cylindrical projection 195, corresponding to the one or more keys (not shown) in the keyhole 1153 of the head 1152 of the second screw rod 115. Three through apertures 193 are respectively defined at three corners of the quadrant-shaped base 192, corresponding to the through holes 134 of the cover 13. Some gold fingers (not labeled) are formed on a bottom end of the grounding plate 196, for connecting with a control circuit (not shown).

Each strain relief boot 14 is generally for guiding and protecting the corresponding optical fiber 1111, 1121. Each interconnection member 16 is generally rectangular. A passageway 161 is defined in each interconnection member 16, for extension of an end of a corresponding retaining body 15 therethrough.

Referring to FIGS. 1–8, to assemble the attenuator 10, the optical fiber 1121 is sequentially extended through a corresponding strain relief boot 14, retaining body 15 and interconnection member 16. The optical fiber 1121 is then retained in the movable collimator 112. The optical fiber 1111 is sequentially extended through other strain relief boot 14, retaining body 15 and interconnection member 16. The optical fiber 1111 is then retained in the fixed collimator 111. The movable collimator 112 is secured in the passage 1131 of the holding device 113. A bolt or epoxy is inserted into the hole 1132 of the holding device 113 to permanently secure the movable collimator 112 in the holding device 113. The thread portion 1141 of the first screw rod 114 is rotatably engaged in the threaded hole 1133 at one lateral side of the holding device 113, such that a distal end of the thread portion 1141 protrudes from an opposite lateral side of the holding device 113. An outer end of each retaining body 15 is snappingly engaged into a corresponding strain relief boot 14, and an inner end of each retaining body 15 is snappingly engaged into the passageway 161 of a corresponding interconnection member 16.

The aforementioned components are then assembled into the rectangular base 12. The interconnection members 16 are respectively retained in the retaining slots 120. The fixed collimator 111 is retained in the cutout 127. The second screw rod 115 is rotatably retained in the round hole 125. The holding device 113 is movably retained in the lateral groove (not labeled) between the ribs 129. The head 1143 of the first screw rod 114 is rotatably retained in the T-shaped groove 126. The gear 1142 of the first screw rod 114 and the thread portion 1151 of the second screw rod 115 are meshed with each other. The protruding distal end of the thread portion 1141 of the first screw rod 114 is rotatably retained in the receiving groove 128. Thus the fixed and movable collimators 111, 112 are generally aligned with each other.

Then the cover 13 is attached on the rectangular base 12. The T-shaped projection 137 is inserted into the T-shaped groove 126, and prevents the head 1143 of the first screw rod 114 from being displaced. The protrusion 138 is inserted in the receiving groove 128, and prevents the protruding distal end of the thread portion 1141 from being displaced. The retaining slots 133 retain the interconnection members 16 therein. The second screw rod 115 is rotatably accommodated in the round hole 135. The head 1152 of the second screw rod 115 is exposed to an exterior of the cover 13.

Finally, the motor 19 is attached on the cover 13. The cylindrical projection 195 is inserted into the keyhole 1153 of the second screw rod 115. The one or more keys (not shown) in the keyhole 1153 of the second screw rod 115 are engaged in the one or more keyways (not shown) of the cylindrical projection 195 of the motor 19. A bottom portion of the cylinder 194 which protrudes below the quadrant-shaped base 192 is fittingly received in a topmost portion of the round hole 135. The quadrant-shaped base 192 is fittingly placed on the quadrant-shaped recessed portion 139. Three screws (not shown) are extended through the through apertures 193 and the through holes 134 to tightly engage in the screw holes 121 of the rectangular base 12. The motor 19, the cover 13 and the base 12 are thereby firmly secured together. The base 12 and the cover 13 cooperatively encase and support the attenuation device 11 therein.

In use, the thread portion 1141 of the first screw rod 114 is rotatably engaged in the threaded hole 1133 of the holding device 113. The gear 1142 of the first screw rod 114 and the thread portion 1151 of the second screw rod 115 are meshed with each other. When the second screw rod 115 is rotated by the motor 19, the thread portion 1151 drives the gear 1142 to rotate the first screw rod 114, and the first screw rod 114 rotatingly drives the holding device 113 to move toward the head 1143 or away from the head 1143. Thus an offset, if any, between the fixed and movable collimators 111, 112 can be adjusted. Accordingly, an amount of optical attenuation of the attenuator 10 can be precisely controlled via the motor 19.

The attenuator 10 of the present invention is easily operated, and relatively inexpensive to manufacture. Furthermore, the amount of optical attenuation can be precisely controlled.

Although the present invention has been described with reference to a specific embodiment, it should be noted that the described embodiment is not necessarily exclusive, and that various changes and modifications may be made to the described embodiment without departing from the scope of the invention as defined by the appended claims.

What is claimed is:

1. A motor driven variable optical attenuator comprising:
    a housing;
    an attenuation device received in the housing, the attenuation device comprising a first collimator, a second collimator generally aligned with the first collimator, and an adjusting device, the adjusting device comprising a first screw rod and a second screw rod, the first collimator retaining a first optical fiber therein, the second collimator retaining a second optical fiber therein; and
    a motor attached to the housing and drivably engaged with the second screw rod of the attenuation device, wherein the first screw rod is drivable by the second screw rod to cause lateral movement of the second collimator thereby controlling offset between the first collimator and the second collimator;
    wherein a round head is formed at a top of the second screw rod, and a keyhole is defined in said round head to facilitate engagement of the motor with the second screw rod.

2. The motor driven variable optical attenuator in accordance with claim 1, wherein the first screw rod comprises a head formed at one end thereof, a thread portion formed at an opposite end thereof, and a gear formed between the thread portion and said head.

3. The motor driven variable optical attenuator in accordance with claim 2, wherein the second screw rod comprises a thread portion meshing with the gear of the first screw rod.

4. The motor driven variable optical attenuator in accordance with claim 1, wherein the housing comprises a base and a cover, and the base and the cover cooperatively encase and support the attenuation device.

5. The motor driven variable optical attenuator in accordance with claim 1, wherein the attenuation device further comprises a holding device, and the holding device defines a passage retainingly receiving the second collimator therein.

6. The motor driven variable optical attenuator in accordance with claim 5, wherein the holding device further defines a threaded hole therein perpendicular to the passage, and the thread portion of the first screw rod is rotatably engaged in the threaded hole.

7. A motor driven variable optical attenuator comprising:
    a housing;
    an attenuation device received in the housing, the attenuation device comprising a first collimator, a second collimator generally aligned with the first collimator, and an adjusting device, the adjusting device comprising a first screw rod and a second screw rod, the first collimator retaining a first optical fiber therein, the second collimator retaining a second optical fiber therein, and
    a motor attached to the housing and drivably engaged with the second screw rod of the attenuation device, wherein the first screw rod is drivable by the second screw rod to cause lateral movement of the second collimator thereby controlling offset between the first collimator and the second collimator;
    wherein the motor further comprises a rotatable portion, and a grounding device which is adapted to connect with a control circuit.

8. The motor driven variable optical attenuator in accordance with claim 7, wherein the rotatable portion further comprises a projection, a keyhole is defined in a top of the second screw rod, and the projection engages in the keyhole to facilitate engagement of the motor with the second screw rod.

9. A variable optical attenuator comprising:
    an attenuation device received in a housing and including first and second collimators aligned with each other in a first direction, an adjusting device including first and second screw rods engaged with each other, wherein
    the first screw rod extends in a second direction perpendicular to said first direction, the second screw rod extends in a third direction perpendicular to both said first and second directions, and the second collimator is laterally moved by said first screw rod in said second direction.

* * * * *